(12) United States Patent
Xiong (10) Patent No.: US 10,270,355 B1
(45) Date of Patent: Apr. 23, 2019

(54) AC-AC CONVERSION CIRCUIT AND DEVICE

(71) Applicant: Shenzhen Segre Electronic Co., Ltd, ShenZhen (CN)

(72) Inventor: Wanglong Xiong, Fujian Province (CN)

(73) Assignee: Shenzhen Segre Electronic Co., Ltd., Shenzhen (CN)

( * ) Notice: Subject to any disclaimer, the term of this patent is extended or adjusted under 35 U.S.C. 154(b) by 0 days.

(21) Appl. No.: 16/042,717

(22) Filed: Jul. 23, 2018

(30) Foreign Application Priority Data

Jun. 15, 2018 (CN) .......................... 2018 1 0617140

(51) Int. Cl.
| | |
|---|---|
| *H02M 5/458* | (2006.01) |
| *H02M 1/32* | (2007.01) |
| *H02M 3/158* | (2006.01) |
| *H02M 7/5387* | (2007.01) |
| *H02M 7/06* | (2006.01) |
| *H02M 1/00* | (2006.01) |

(52) U.S. Cl.
CPC .......... *H02M 5/4585* (2013.01); *H02M 1/32* (2013.01); *H02M 3/158* (2013.01); *H02M 7/06* (2013.01); *H02M 7/53871* (2013.01); *H02M 2001/0009* (2013.01)

(58) Field of Classification Search
CPC .................. H02M 1/44; H02M 3/158; H02M 2001/0009; H02M 7/53871; H02P 9/48; Y02E 10/763

USPC ......... 363/34–39, 41, 44, 95, 124, 125, 131; 361/699

See application file for complete search history.

(56) References Cited

U.S. PATENT DOCUMENTS

| | | | | |
|---|---|---|---|---|
| 5,416,686 | A * | 5/1995 | Azuma | H02M 5/458 363/37 |
| 5,652,485 | A * | 7/1997 | Spiegel | F03D 7/0272 318/147 |
| 5,764,023 | A * | 6/1998 | Wieloch | H02H 7/0833 318/803 |
| 9,350,261 | B2 * | 5/2016 | Komatsu | H02J 3/386 |
| 2010/0025995 | A1 * | 2/2010 | Lang | H02M 5/4505 290/44 |

* cited by examiner

*Primary Examiner* — Rajnikant B Patel
(74) *Attorney, Agent, or Firm* — Jenkins, Wilson, Taylor & Hunt, P.A.

(57) ABSTRACT

An AC-AC conversion circuit with AC-AC conversion control and AC voltage conversion including a voltage feedback circuit, a voltage detection circuit, a first drive circuit, a current detection circuit, a second drive circuit and a main control circuit. By using the main control circuit as the main control center, which has strong reliability and good circuit stability, the defects of complicated circuit structure and low reliability, and poor stability of the supply circuit in the existing AC-AC conversion circuit may be overcome. Also disclosed is an AC-AC conversion device which has good stability due to the highly reliable AC-AC conversion circuit thereof.

13 Claims, 8 Drawing Sheets

Fig. 8

AC-AC CONVERSION CIRCUIT AND DEVICE

CROSS-REFERENCE TO RELATED APPLICATION

This application claims priority to Chinese patent application CN 201810617140.1 filed Jun. 15, 2018, the entire disclosure of which is incorporated by reference herein.

TECHNICAL FIELD

The present disclosure relates to the field of power supply, and more particularly to an AC-AC conversion circuit and device.

BACKGROUND

A supply circuit refers to the circuit design, the circuit form and feature used in a part of a power supply for supplying power to an electric device. There are both AC power supply and DC power supply.

At present, in the AC-AC conversion circuit, the circuit structure is complicated and the reliability is low, thereby leading to poor stability of the supply circuit.

SUMMARY

In order to solve the technical problem above, the present disclosure aims at providing an AC-AC conversion circuit and device which is simple in structure, highly reliable and stable.

According to a first aspect of the present disclosure, an AC-AC conversion circuit is provided comprising:
an AC output end,
an AC-AC conversion unit, comprising:
 a rectified filter circuit with an input end connected to the AC input end,
 a DC-DC conversion circuit with an input end connected to an output end of the rectified filter circuit, and
 a DC-AC inverter circuit with an input end connected to an output end of the DC-DC conversion circuit and an output end connected to the AC output end,
a voltage feedback circuit with an input end connected to the output end of the DC-DC conversion circuit,
a voltage detection circuit with an input end connected to the output end of the DC-DC conversion circuit,
a first drive circuit with an input end connected to an output end of the voltage feedback circuit and an output end connected to the input end of the DC-DC conversion circuit,
a current detection circuit with an input end connected to the output end of the DC-AC inverter circuit,
a second drive circuit with an output end connected to the input end of the DC-AC inverter circuit, and
a main control circuit with an input end connected to both of an output end of the current detection circuit and an output end of the voltage detection circuit, and an output end connected to both of the input end of the first drive circuit and an input end of the second drive circuit.

The AC-AC conversion circuit further comprises a DC supply circuit with an output end connected to each of the input end of the first drive circuit, the input end of the voltage feedback circuit, the input end of the main control circuit and the input end of the second drive circuit.

The AC-AC conversion circuit further comprises a temperature detection circuit with an output end connected to the input end of the main control circuit.

The AC-AC conversion circuit further comprises a fan control circuit with an input end connected to the output end of the main control circuit.

The voltage feedback circuit further comprises:
a first sampling resistor with one end connected to the output end of the DC-DC conversion circuit,
a second sampling resistor with one end connected to the other end of the first sampling resistor and the other end grounded,
a third sampling resistor with one end connected to the other end of the second sampling resistor,
a fourth sampling resistor with one end connected to the other end of the first sampling resistor and the other end connected to the other end of the third sampling resistor, and
a voltage comparator with an input end connected to the other end of the fourth sampling resistor and an output end connected to the input end of the first sampling resistor.

The main control circuit further comprises a singlechip.

The current detection circuit further comprises:
an overcurrent detection circuit with an input end connected to the output end of the DC-AC inverter circuit and an output end connected to the input end of the main control circuit, and
an overload detection circuit with an input end connected to the output end of the DC-AC inverter circuit and an output end connected to the input end of the main control circuit.

The overcurrent detection circuit further comprises:
a fifth sampling resistor with one end connected to the output end of the DC-AC inverter circuit and the other end grounded,
a current sampling resistor with one end connected to the output end of the DC-AC inverter circuit and the other end connected to the input end of the main control circuit, and
a first filter capacitor with one end connected to the other end of the current sampling resistor and the other end grounded.

The overload detection circuit further comprises:
a sixth sampling resistor,
a seventh sampling resistor with one end connected to the one end of the fifth sampling resistor and the other end connected to one end of the sixth sampling resistor, wherein the other end of the sixth sampling resistor is grounded, and
a second filter capacitor with one end connected to both of the other end of the seventh sampling resistor and the input end of the main control circuit and the other end grounded.

The DC-DC conversion circuit further comprises:
a LC filter with an output end connected to each of the input end of the DC-AC inverter circuit, the input end of the voltage feedback circuit and the input end of the voltage detection circuit,
a first switching transistor with a positive output end connected to the output end of the rectified filter circuit, a control end connected to the output end of the first drive circuit, and a negative output end connected to an input end of the LC filter, and/or
a second switching transistor with a positive output end connected to the output end of the rectified filter circuit, a control end connected to the output end of the first drive circuit, and a negative output end connected to the input end of the LC filter.

The voltage detection circuit further comprises:
a first voltage sampling resistor,
a second voltage sampling resistor,
a third voltage sampling resistor,
a fourth voltage sampling resistor, and
a third filter capacitor, wherein the output end of the DC-DC conversion circuit is connected to one end of the third voltage sampling resistor, the other end of the third voltage sampling resistor is connected to both of one end of the second voltage sampling resistor and one end of the fourth voltage sampling resistor, the other end of the second voltage sampling resistor is connected to one end of the first voltage sampling resistor and one end of the third filter capacitor; the other end of the first voltage sampling resistor, the other end of the fourth voltage sampling resistor and the other end of the third filter capacitor are grounded, and one end of the third filter capacitor is connected to the input end of the main control circuit.

The AC-AC conversion circuit further comprises:
a protection circuit comprising:
a thyristor with a first connecting end connected to the AC input end and a second connecting end connected to the input end of the rectified filter circuit, and
a thyristor control circuit with an input end connected to the output end of the main control circuit and an output end connected to a control end of the thyristor,
wherein the output end of the voltage feedback circuit is connected to both of the input end of the main control circuit and the input end of the thyristor control circuit.

According to a second aspect of the present disclosure, an AC-AC conversion device comprises the AC-AC conversion circuit is provided.

The present disclosure has the beneficial effect that:

The AC-AC conversion circuit in the present disclosure realizes the AC-AC conversion control and therefore the AC voltage conversion by comprising the voltage feedback circuit, the voltage detection circuit, the first drive circuit, the current detection circuit, the second drive circuit and the main control circuit, which is structurally simple and clear. By using the main control circuit as the main control center, which has strong reliability and good circuit stability, the defects of complicated circuit structure and low reliability, and poor stability of the supply circuit in the existing AC-AC conversion circuit may be overcome.

The present disclosure has another beneficial effect that:

The AC-AC conversion device in the present disclosure has good stability due to the highly reliable AC-AC conversion circuit thereof.

BRIEF DESCRIPTION OF THE DRAWINGS

The specific embodiments of the present disclosure are further described below with reference to the accompanying drawings.

DETAILED DESCRIPTION

It should be noted that the embodiments in the present application and the features in the embodiments may be combined with each other in case of no conflicts.

Figure 1:
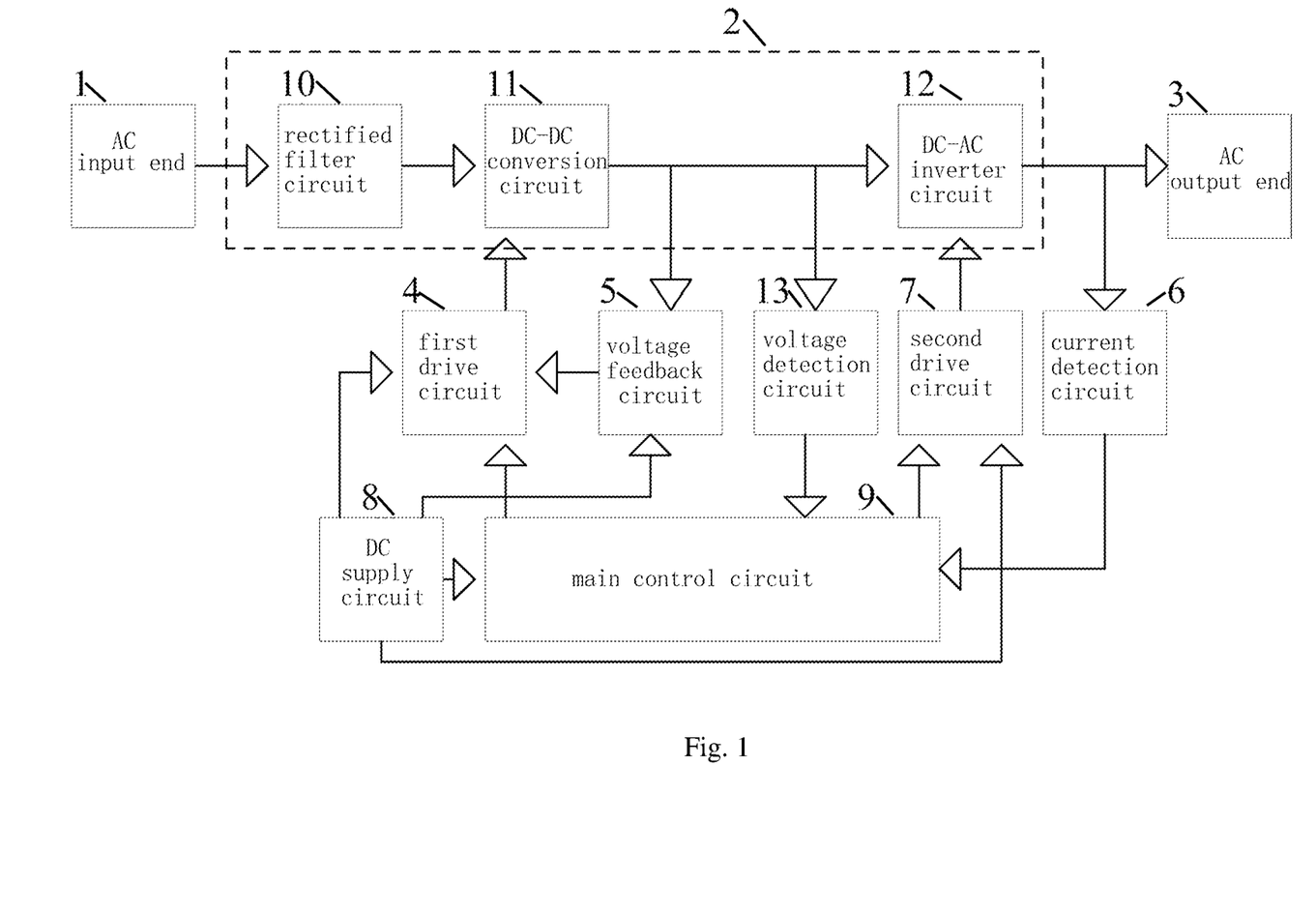
FIG. 1 is a structural block diagram of a specific embodiment of an AC-AC conversion circuit in the present disclosure.

An AC-AC conversion device comprises an AC-AC conversion circuit, and with reference to FIG. 1, which is a structural block diagram of a specific embodiment of an AC-AC conversion circuit in the present disclosure. The AC-AC conversion circuit comprises an AC input end 1, an AC output end 3 and an AC-AC conversion unit 2, the AC-AC conversion unit 2 comprises a rectified filter circuit 10, a DC-DC conversion circuit 11 and a DC-AC inverter circuit 12, the AC input end 1 is connected to an input end of the rectified filter circuit 10, an output end of the rectified filter circuit 10 is connected to an input end of the DC-DC conversion circuit 11, an output end of the DC-DC conversion circuit 11 is connected to an input end of the DC-AC inverter circuit 12, and an output end of the DC-AC inverter circuit 12 is connected to the AC output end 3. In this embodiment, the AC-AC conversion circuit further comprises a voltage feedback circuit 5, a voltage detection circuit 13, a first drive circuit 4, a current detection circuit 6, a second drive circuit 7, a DC supply circuit 8 and a main control circuit 9. An output end of the DC supply circuit 8 is connected to each of the input end of the first drive circuit 4, the input end of the voltage feedback circuit 5, the input end of the main control circuit 9 and the input end of the second drive circuit 7 for power supply thereof. The output end of the DC-DC conversion circuit 11 is connected to both of the input end of the voltage feedback circuit 5 and an input end of the voltage detection circuit 13. The output end of the DC-AC inverter circuit 12 is connected to an input end of the current detection circuit 6, the voltage feedback circuit 5 is configured to detect the voltage at the output end of the DC-DC conversion circuit 11 for feedback control by a subsequent electric circuit. An output end of the voltage feedback circuit 5 is connected to an input end of the first drive circuit 4. An output end of the current detection circuit 6 and an output end of the voltage detection circuit 13 are both connected to an input end of the main control circuit 9, and an output end of the main control circuit 9 is connected to both of the input end of the first drive circuit 4 and an input end of the second drive circuit 7. An output end of the first drive circuit 4 is connected to the input of the DC-DC conversion circuit 11, and an output end of the second drive circuit 7 is connected to the input end of the DC-AC inverter circuit 12. The current detection circuit 6 is configured to detect the current at the output end of the DC-AC inverter circuit 12 for feedback control by the main control circuit 9 that controls the operation of the first drive circuit 4 and the second drive circuit 7 according to a current signal detected by the current detection circuit 6. The voltage detection circuit 13 is configured to detect the voltage at the output end of the DC-DC conversion circuit 11 for processing by the main control circuit to control the operation of the second drive circuit.

In the AC-AC conversion circuit of the present disclosure, the DC supply circuit is configured for power supply to the voltage feedback circuit, the current detecting circuit, the first drive circuit, the second drive circuit and the main control circuit. The voltage feedback circuit, the voltage detection circuit and the current detection circuit are added to feed back and detect a circuit signal. The first drive circuit, the second drive circuit and the main control circuit are configured to realize AC-AC conversion control, which comprises DC-DC conversion control and DC-AC inverter control, thereby realizing AC voltage conversion, and the structure of the AC-AC conversion circuit is simple and clear. The main control circuit, as a main control center, has strong reliability and good circuit stability, and overcomes the defects of complicated circuit structure and low reliability in the existing AC-AC conversion circuit and poor stability of a supply circuit. In addition, the AC-AC conversion device in the present disclosure has good stability due to the highly reliable AC-AC conversion circuit thereof.

Figure 2:
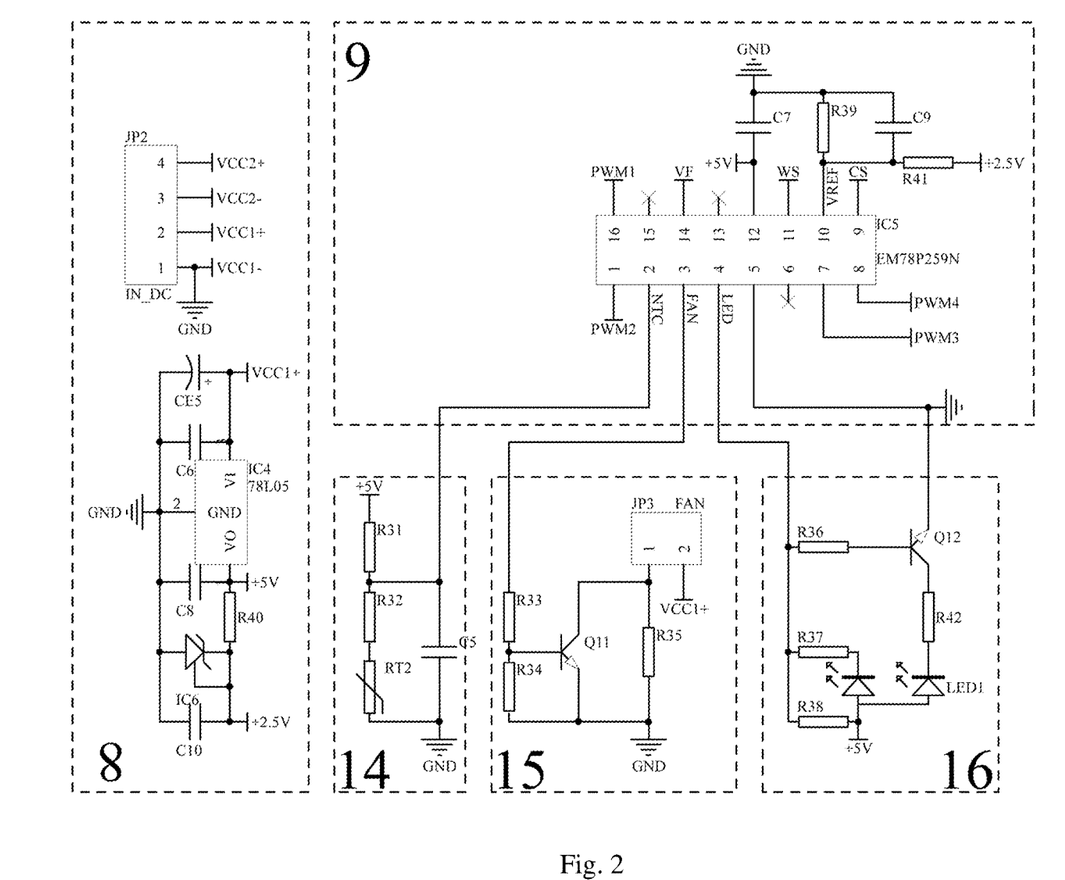
FIG. 2 is a circuit diagram of a specific embodiment of a main control circuit, a DC supply circuit, a temperature detection circuit, a fan control circuit and an LED indication circuit of an AC-AC conversion circuit in the present disclosure.

In the prior art, different control chips are required for the DC-DC conversion circuit and the DC-AC inverter circuit to control the corresponding circuits thereof, for example: controlling the DC-DC conversion circuit by UC3843 control chip, and controlling the DC-AC inverter circuit by TL494 control chip. This combinational circuit in a multiple chip control mode increases the complexity of the control circuit. In the case of the multiple chip control mode, when any of the chips is unstable, the other chip can be interfered to be unstable, which is not conducive to the stability of the performance of combinational circuit. In this embodiment, the singlechip is used by the main control circuit as a processor, the AC-AC conversion circuit uses a single singlechip as the control chip to control the operation of circuit, so as to avoid the interference between multiple control chips, enhance the stability of the circuit and improve the reliability of the circuit. Moreover, the circuit becomes more concise. With reference to FIG. 2, which is a circuit diagram of a specific embodiment of a main control circuit, a DC supply circuit, a temperature detection circuit, a fan control circuit and an LED indication circuit of an AC-AC conversion circuit in the present disclosure. In the main control circuit 9, EM78P259N singlechip IC5 is selected as the singlechip.

Figure 3:
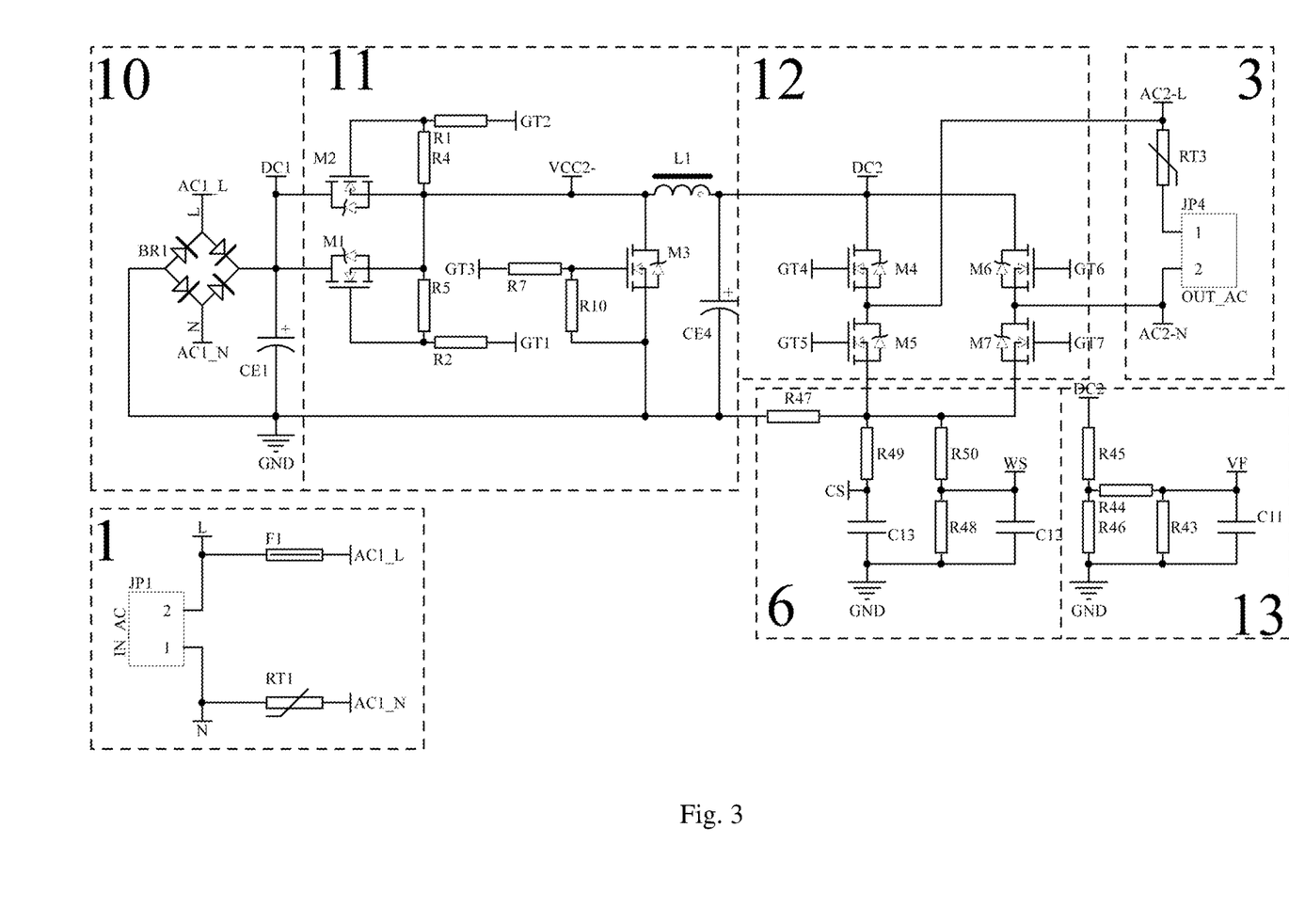
FIG. 3 is a circuit diagram of a specific embodiment of an AC input end, an AC-AC conversion unit, an AC output end, a current detection circuit and a voltage detection circuit of the AC-AC conversion circuit in the present disclosure.

As a further improvement of the technical solution, with reference to FIG. 1 and FIG. 3 in which FIG. 3 is a circuit diagram of a specific embodiment of an AC input end, an AC-AC conversion unit, an AC output end, a current detection circuit and a voltage detection circuit of the AC-AC conversion circuit in the present disclosure. In the AC input end 1, an AC such as 110V or 220V commercial power is introduced via an AC input terminal JP1, and forms a first AC signal AC1, after flowing through a protective tube F1 and a thermistor RT1, which is input to the input end of the AC-AC conversion unit, i.e., the input end of the rectified filter circuit 10. Specifically, the rectified filter circuit 10 comprises a rectifier bridge BR1 and a capacitor CE1, and a first DC signal DC1 is formed by rectifying and filtering via the rectifier bridge BR1 and the capacitor CE1. In addition, the DC-DC conversion circuit 11 comprises a LC filter (i.e., an inductor L1 and a capacitor CE4), a first switching transistor M1 and/or a second switching transistor M2, a positive output end of the first switching transistor M1 and a positive output end of the second switching transistor M2 are both connected to the output end of the rectified filter circuit 10 (i.e., DC1), a control end of the first switching transistor M1 and a control end of the second switching transistor M2 are both connected to the output end of the first drive circuit 4 (i.e., GT1 and GT2), a negative output end of the first switching transistor M1 and a negative output end of the second switching transistor M2 are both connected to an input end of the LC filter, and an output end of the LC filter (i.e., DC2) is connected to each of the input end of the DC-AC inverter circuit 12, the input end of the voltage feedback circuit 5 and the input end of the voltage detection circuit 13. The DC-DC conversion circuit 11 further comprises a third switching transistor M3 comprising a control end connected to the output end of the first drive circuit 4 (i.e., GT3), a negative output end grounded, a positive output end connected to a power supply and connected to the negative output end of the second switching transistor M2. In this embodiment, the first switching transistor M1, the second switching transistor M2 and the third switching transistor M3 are implemented by using a power transistor, such as MOS transistor with a gate as a control end, a source as a negative output end, and a drain as a positive output end. A PWM control signal is transmitted from the first drive circuit 4 to the positive output end of the first switching transistor M1 and the positive output end of the second switching transistor M2 to change a duty ratio and realize DC-DC voltage reduction, and then filtered by the LC filter. The duty ratio can be changed through controlling the first switching transistor M1 or the second switching transistor M2, and the duty ratio can also be changed through controlling the first switching transistor M1 and the second switching transistor M2 to be alternatively turned on.

Figure 4:
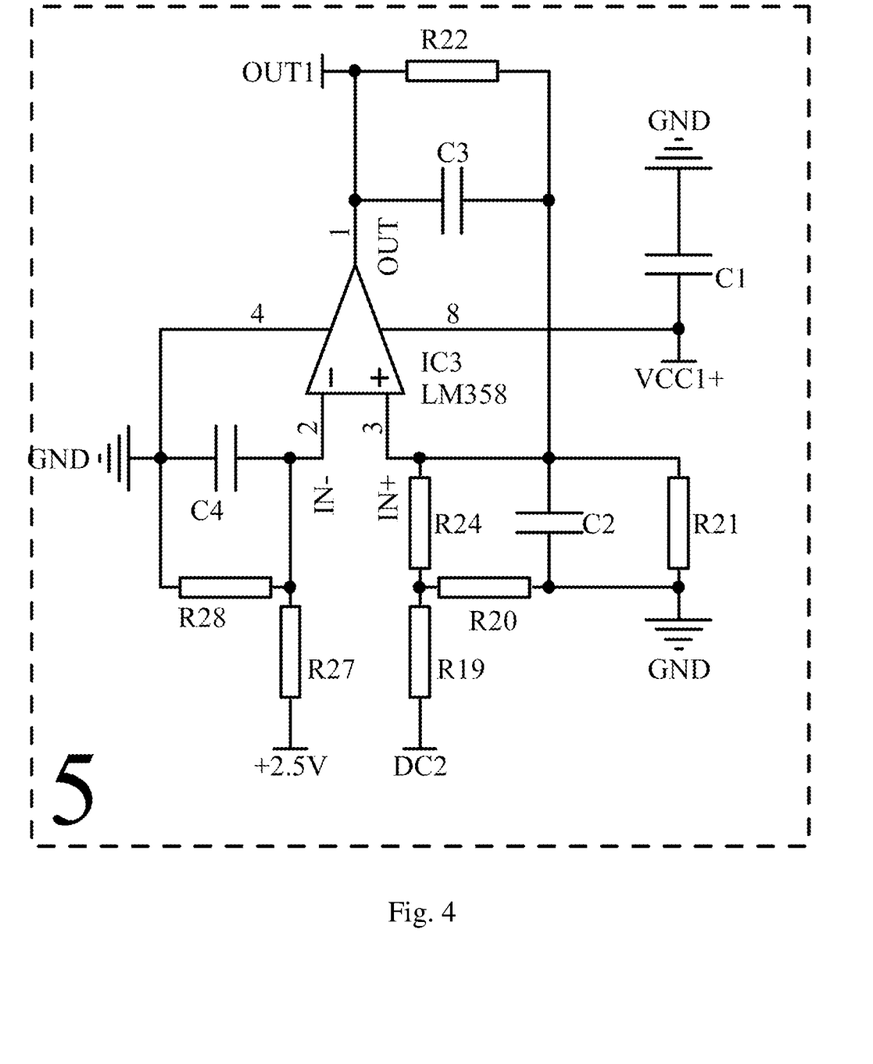
FIG. 4 is a circuit diagram of a specific embodiment of a voltage feedback circuit of the AC-AC conversion circuit in the present disclosure.
Figure 5:
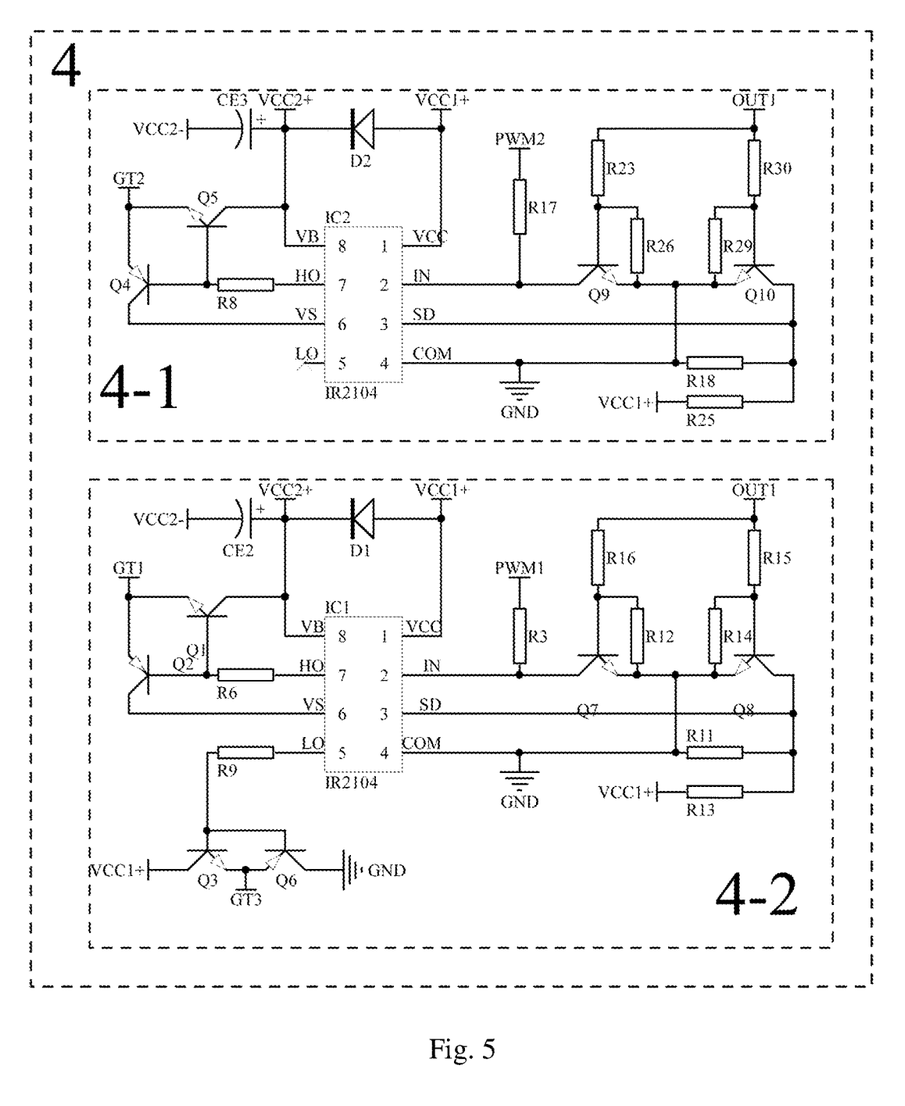
FIG. 5 is a circuit diagram of a specific embodiment of a first drive circuit of the AC-AC conversion circuit in the present disclosure.

Meanwhile, with reference to FIG. 4, which is a circuit diagram of a specific embodiment of the voltage feedback circuit of the AC-AC conversion circuit in the present disclosure. The voltage feedback circuit 5 comprises a first sampling resistor R19, a second sampling resistor R20, a third sampling resistor R21, a fourth sampling resistor R24 and a voltage comparator IC3 which in this embodiment is a LM358 dual operational amplifier. The output end of the DC-DC conversion circuit 11 (i.e., a second DC signal DC2) is connected to one end of the first sampling resistor R19, the other end of the first sampling resistor R19 is both connected to one end of the second sampling resistor R20 and one end of the fourth sampling resistor R24, the other end of the second sampling resistor R20 is grounded, the other end of the second sampling resistor R20 is connected to one end of the third sampling resistor R21, the other end of the third sampling resistor R21 is connected to the other end of the fourth sampling resistor R24, the other end of the fourth sampling resistor R24 is connected to an input end of the voltage comparator IC3, and an output end OUT1 of the voltage comparator IC3 is connected to the input end of the first drive circuit 4. With reference to FIG. 2, FIG. 3 and FIG. 5 in which FIG. 5 is a circuit diagram of a specific embodiment of a first drive circuit of the AC-AC conversion circuit in the present disclosure. The first drive circuit 4 comprises two single-channel drive circuits 4-1 and 4-2, the single-channel drive circuit is a half-bridge driver IR2104 and a peripheral circuit thereof, and the half-bridge driver IR2104 is respectively IC1 and IC2. When the DC-DC conversion circuit adjusts the duty ratio by a single switching transistor, only one single-channel drive circuit is needed; and when two switching transistors are used for adjustment at the same time, two single-channel drive circuits 4-1 and 4-2 need to be arranged to control the on and off of the two switching transistors. In this embodiment, the first switching transistor M1 and the second switching transistor M2 are arranged to adjust the duty ratio at the same time, the first drive circuit 4 is connected to the input end of the DC-DC conversion circuit 11 through GT1, GT2 and GT3 to respectively control the turn-off of the first switching transistor M1, the second switching transistor M2 and the power transistor M3. A PWM digital signal is output alternatively by ports PWM1 and PWM2 of the main control circuit 9 to two single-channel drive circuits, to control two half-bridge drivers to respectively drive the first switching transistor M1 and the second switching transistor M2 to be alternatively turned on, so as to realize DC-DC conversion. Specifically, the PWM digital signal is output by the ports PWM1 and PWM2 of the singlechip 105 in the main control circuit 9 to IN ends of the half-bridge driver IC1 and the half-bridge driver IC2 in the first drive circuit 4, then the PWM signal is alternately output by HO ports of the half-bridge driver IC1 and the half-bridge driver IC2 to drive the first switching transistor M1 and the second switching transistor M2 to be alternately turned on, and through a LC filtering rectifier circuit composed of the inductor L1 and the capacitor CE4, the PWM signal is output through a LO port of the half-bridge driver IC1 to drive the power transistor M3 to be turned on at the same time (wherein the power transistor M3 can be replaced by a rectifier diode), so as to form the second DC signal DC2 to provide a current circuit for the LC filtering rectifier circuit. Moreover, the second DC signal DC2 is detected at port IN+ of the voltage comparator IC3 in the voltage feedback circuit 5 through the first sampling resistor R19, the second sampling resistor R20, the third sampling resistor R21 and the fourth sampling resistor R24, the detected second DC signal DC2 is compared with a reference voltage at port IN− of the voltage comparator IC3 in the voltage feedback circuit 5 to determine whether it is higher or lower than the reference voltage, a feedback signal is output to the first drive circuit 4 through port OUT of the voltage comparator IC3, and the first drive circuit 4 controls the on and off of the first switching transistor M1, the second switching transistor M2 and the power transistor M3 to stabilize the second DC signal DC2.

Figure 6:
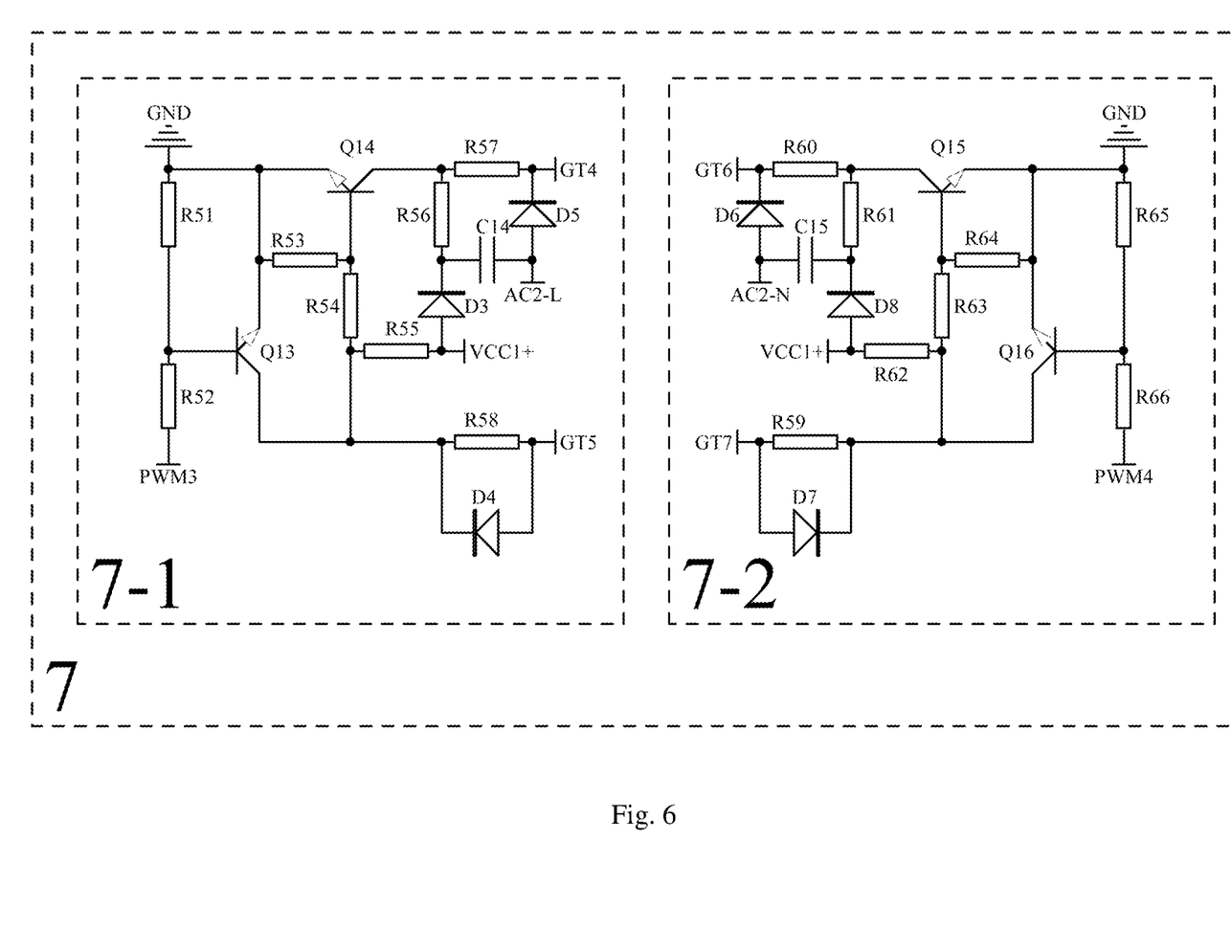
FIG. 6 is a circuit diagram of a specific embodiment of a second drive circuit of the AC-AC conversion circuit in the present disclosure.

As a further improvement of the technical solution, with reference to FIG. 2 and FIG. 3, the DC-AC inverter circuit 12 comprises a power transistor M4, a power transistor M5, a power transistor M6, and a power transistor M7. A converted AC signal is output by the AC output end 3 through an AC output port JP4. With reference to FIG. 6 which is a circuit diagram of a specific embodiment of a second drive circuit of the AC-AC conversion circuit in the present disclosure, the second drive circuit 7 is configured to control the inverting operation of the DC-AC inverter circuit 12. Specifically, the second drive circuit 7 comprises a sub-drive circuit 7-1 by which GT4 and GT5 signals are output to control the on and off of the power transistor M4 and the power transistor M5, and a sub-drive circuit 7-2 by which GT6 and GT7 signals are output to control the on and off of the power transistor M6 and the power transistor M7. The singlechip IC5 of the main control circuit 9 controls the sub-drive circuits 7-1 and 7-2 through the ports PWM3 and PWM4 respectively. The second DC signal DC2 passes through the power transistor M4, the power transistor M5, the power transistor M6 and the power transistor M7, the PWM signal is output by the second drive circuit 7 through GT4, GT5, GT6 and GT7 output ports to control the power transistor M4 and the power transistor M7, and the power transistor M5 and the power transistor M6 to be alternately turned on, and the second DC signal DC2 is converted into the second AC signal AC2 and output to the AC output end 3 to achieve the purpose of DC-AC conversion, thereby realizing AC-AC conversion.

With reference to FIG. 2 and FIG. 3, the current detection circuit 6 comprises an overcurrent detection circuit and an overload detection circuit, the output end of the DC-AC inverter circuit is connected to an input end of the overcurrent detection circuit and an input end of the overload detection circuit, and an output end of the overcurrent detection circuit and an output end of the overload detection circuit are both connected to the input end of the main control circuit. Specifically, the overcurrent detection circuit comprises a fifth sampling resistor R47, a current sampling resistor R49 and a first filter capacitor C13, the output end of the DC-AC inverter circuit 12 is connected to both of one end of the fifth sampling resistor R47 and one end of the current sampling resistor R49, the other end of the fifth sampling resistor R47 is grounded, the other end of the current sampling resistor R49 is connected to both of the input end CS of the main control circuit and one end of the first filter capacitor C13, and the other end of the first filter capacitor C13 is grounded. The voltage across the fifth sampling resistor R47 is sampled by the overcurrent detection circuit via the current sampling resistor R49 and filtered by the first filter capacitor C13 to obtain an overcurrent signal CS. The overcurrent signal from the overcurrent detection circuit can be calculated more accurately by multiple sampling the overcurrent signal via the port CS of the singlechip IC5 and using an average value calculation method. The intensity of the overcurrent signal is judged through comparing the detected overcurrent signal CS with the reference voltage signal set for a VREF port of the singlechip IC5 by an internal program of the singlechip IC5, so as to judge whether over-current occurs at the AC output end which can be closed through controlling the PWM signal of PWM1, PWM2, PWM3 and PWM4 ports thereby achieving the purpose of overcurrent protection.

With reference to FIG. 2 and FIG. 3, the overload detection circuit comprises a sixth sampling resistor R48, a seventh sampling resistor R50 and a second filter capacitor C12, one end of the fifth sampling resistor R47 is connected to one end of the seventh sampling resistor R50, the other end of the seventh sampling resistor R50 is connected to both of one end of the sixth sampling resistor R48 and one end of the second filter capacitor C12, the other end of the sixth sampling resistor R48 and the other end of the second filter capacitor C12 are grounded, and one end of the second filter capacitor C12 is connected to an input end WS of the main control circuit. The overload detection circuit conducts voltage dividing, filtering and sampling to the voltage across the fifth sampling resistor R47 by the sixth sampling resistor R48, the seventh sampling resistor R50 and the second filter capacitor C12 to acquire an output overload signal WS. The overload signal from the overload detection circuit can be calculated more accurately by multiple sampling the overload signal via the port WS of the singlechip IC5 and using an average value calculation method. The intensity of the overload signal is judged through comparing the detected overload signal WS with the reference voltage signal set for a VREF port of the singlechip IC5 by an internal program of the singlechip IC5, so as to judge whether overload occurs at the AC output end which can be closed through controlling the PWM signal of PWM1, PWM2, PWM3 and PWM4 ports thereby achieving the purpose of overload protection. Meanwhile, the intensity of the overload signal can be changed by changing a voltage dividing ratio of the sixth sampling resistor R48 and the seventh sampling resistor R50, thereby adjusting the overload power at the AC output end.

In addition, with reference to FIG. 2, FIG. 3 and FIG. 6, the voltage detection circuit 13 comprises a first voltage sampling resistor R43, a second voltage sampling resistor R44, a third voltage sampling resistor R45, a fourth voltage sampling resistor R46 and a third filter capacitor C11, the output end of the DC-DC conversion circuit 11 (i.e., DC2) is connected to one end of the third voltage sampling resistor R45, the other end of the third voltage sampling resistor R45 is connected to both of one end of the second voltage sampling resistor R44 and one end of the fourth voltage sampling resistor R46, the other end of the second voltage sampling resistor R44 is connected to both of one end of the first voltage sampling resistor R43 and one end of the third filter capacitor C11, the other end of the first voltage sampling resistor R43, the other end of the fourth voltage sampling resistor R46 and the other end of the third filter capacitor C11 are all grounded, and one end of the third filter capacitor C11 is connected to an input end VF of the main control circuit. An output voltage signal VF is obtained by voltage dividing among the first voltage sampling resistor R43, the second voltage sampling resistor R44, the third voltage sampling resistor R45, and the fourth voltage sampling resistor R46 and filtering via the third filter capacitor C11 in the voltage detection circuit 13. The intensity of the voltage of the second DC signal DC2 is judged by the internal program of the singlechip IC5 according to the value of detected output voltage signal VF. The PWM digital signal that can stabilize the second AC signal AC2 by detecting a stable second DC signal DC2 at the VF port of the singlechip IC5 and then conducting root-mean-square calculation thereon by the internal program thereof, thereby stabilizing the AC output. Meanwhile, the PWM digital signal is output to the second drive circuit 7 through controlling the PWM3 and PWM4 ports, and then the power transistor M4, the power transistor M5, the power transistor M6 and the power transistor M7 are driven by the second drive circuit 7 to close the AC output end 3 to achieve the purpose of overvoltage protection. It is noted that, with reference to FIG. 1, the voltage detection circuit 13 is arranged at a front end of the DC-AC inverter circuit to realize the front-end voltage detection. When the voltage of the circuit at the front end is abnormal, the main control circuit 9 can control the second drive circuit 7 to be inactive such that the power transistor in the DC-AC inverter circuit 12 is inactive, preventing the power transistor from being damaged by the abnormal voltage at the front end. Moreover, the front-end detection performs a fast response to abnormal voltages, preventing abnormal voltages from causing greater damage to the circuit.

Further, with reference to FIG. 1 to FIG. 6, in the DC supply circuit 8, two sets of DC supply signals VCC1 and VCC2 are input to a port JP2, and meanwhile, +5V is output through a three-terminal voltage regulator IC4 which in this embodiment is a 78L05 voltage regulation chip; and then +2.5V is output through programmable voltage regulator IC6. The first drive circuit 4, the second drive circuit 7, the voltage feedback circuit 5 and the main control circuit 9 are respectively supplied by the DC supply circuit 8. In specific working process, after normal power supply by the DC power supply circuit 8, the singlechip IC5 of the main control circuit 9 firstly performs self-test on each port of the singlechip comprising the overcurrent detection circuit in the current detection circuit 6 connected to CS, the overload detection circuit in the current detection circuit 6 connected to WS, and the voltage detection circuit 13 for the second DC signal DC2 connected to VF. After the self-test of the singlechip is completed and normal, the PWM digital signal is output to the first drive circuit 4 alternately through the PWM1 and PWM2 ports, and the first DC signal DC1 is converted into the second DC signal DC2 by the first drive circuit 4. Meanwhile, the second DC signal DC2 is detected by the voltage feedback circuit 5 and a feedback signal is output to the first drive circuit 4 to stabilize the second DC signal DC2. The PWM digital signal which can stabilize the second AC signal AC2 is calculated by detecting the second DC signal DC2 by the singlechip IC5 at the VF port and conducting the root-mean-square calculation thereon through the internal program. The PWM digital signal is output to the second drive circuit 7 by controlling the PWM3 and PWM4 ports, to drive by the second drive circuit 7 the power transistor M4, the power transistor M5, the power transistor M6 and the power transistor M7 to alternately turn on, and the second DC signal DC2 is converted into the second AC signal AC2 to be output to the AC output end 3. Meanwhile, the singlechip IC5 detects the change of the current at the AC output end through the current detection circuit 6, and the AC output end can be quickly and accurately protected, thereby achieving the purpose of digital AC conversion control.

As a further improvement of the technical solution, with reference to FIG. 2, the AC-AC conversion circuit further comprises a temperature detection circuit 14 and a fan control circuit 15, an output end of the temperature detection circuit 14 is connected to the input end of the main control circuit 9, and the output end of the main control circuit 9 is connected to an input end of the fan control circuit 15. Voltage dividing is conducted in the temperature detection circuit 14 by the thermistor RT2 and the resistors R31 and R32, the voltage signal is acquired through a filtering capacitor C5. The voltage signal from the temperature detection circuit 14 can be more accurately calculated by multiple sampling the voltage signal from the temperature detection circuit 14 at a NTC port of the singlechip IC5 and using average value calculation method, thereby judging the accuracy of the signal detected by the temperature detection circuit. The fan control circuit controls the voltage of a fan port JP3 connected to a triode Q11 by drive resistors R33, R34 and R35. When self-test is conducted to the singlechip IC5, the self-test port further comprises the temperature detection circuit 14 connected to NTC. When the temperature detection circuit 14 detects that the operating temperature is higher than the temperature value set by the internal program of the singlechip IC5, the voltage signal is output to the fan control circuit 15 via FAN port of the singlechip IC5 to control the on and off of the fan port JP3, and the operational stability of the circuit can be ensured by controlling the fan to operate to reduce the operating temperature.

As a further improvement of the technical solution, with reference to FIG. 2, the AC-AC conversion circuit further comprises an indication circuit 16, the output end of the main control circuit 9 is connected to an input end of the indication circuit 16. In this embodiment, the indication circuit 16 is an LED indication circuit, and the indication circuit 16 is configured to indicate the state of the circuit. For example, when the temperature detected by the temperature detection circuit 14 exceeds the set temperature value, an LED of the LED indication circuit is controlled to light in red; and when the temperature is normal, the LED lights in green. The LED indication circuit can further indicate the operating state of the AC-AC conversion circuit, and the LED lights in green when the circuit is operating and in red when the circuit is in standby state.

Figure 7:
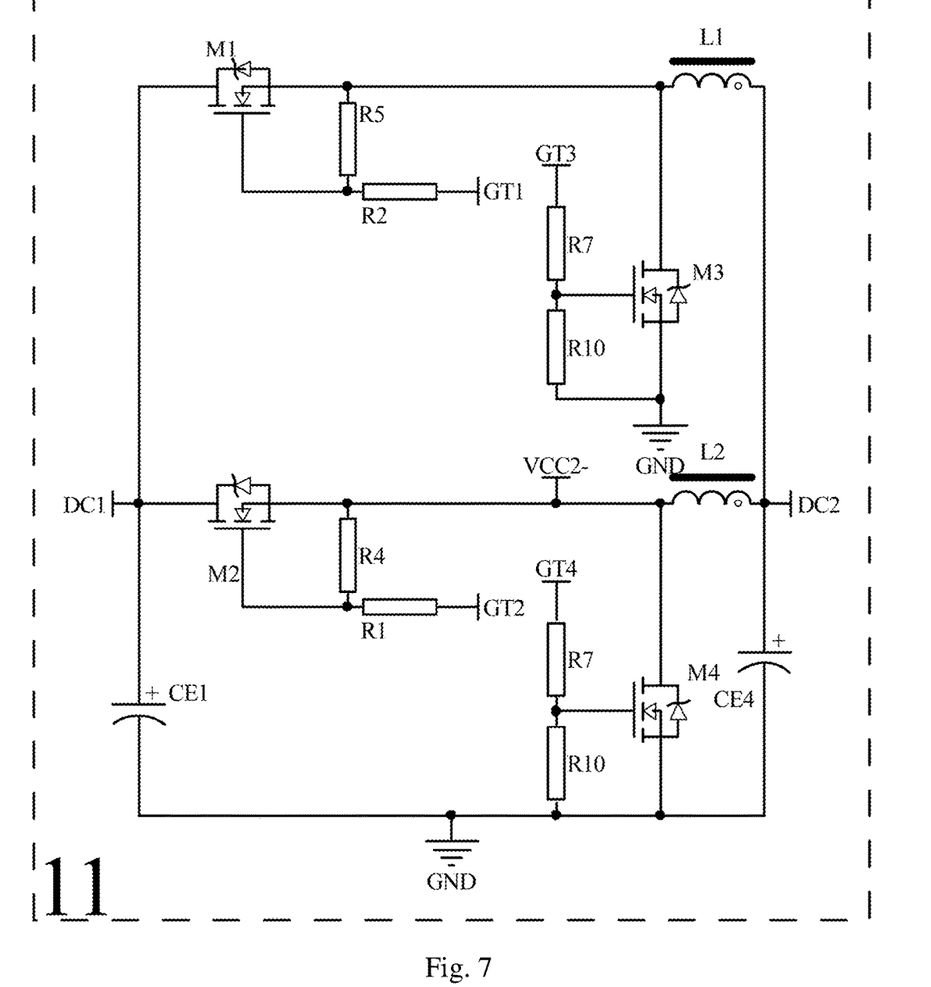
FIG. 7 is a circuit diagram of a specific embodiment of a DC-DC conversion circuit of the AC-AC conversion circuit in the present disclosure.

As a further improvement of the technical solution, with reference to FIG. 7 which is a circuit diagram of a specific embodiment of a DC-DC conversion circuit of the AC-AC conversion circuit in the present disclosure. In this embodiment, the DC-DC conversion circuit 11 comprises a LC filter (i.e., an inductor L1, an inductor L2, and a capacitor CE4), a first switching transistor M1, a second switching transistor M2, a third switching transistor M3 and a fourth switching transistor M4. With reference to FIG. 2 and FIG. 3, the output end DC1 of the rectified filter circuit is connected to both of the positive output end of the first switching transistor M1 and the positive output end of the second switching transistor M2. The negative output end of the first switching transistor M1 is connected to both of the input end of the LC filter (i.e., one end of the inductor L1) and the positive output end of the third switching transistor M3, the negative output end of the third switching transistor M3 is grounded. The negative output end of the second switching transistor M2 is connected to each of the input ends of a power supply VCC2- and the LC filter (i.e., one end of the inductor L2) and the positive output end of the fourth switching transistor M4. The negative output end of the fourth switching transistor M4 is grounded. The control end of the first switching transistor M1, the control end of the second switching transistor M2, the control end of the third switching transistor M3 and the control end of the fourth switching transistor M4 are respectively connected to the output end of the first drive circuit and are controlled thereby. The output end of the LC filter is connected to the input end of the DC-AC inverter circuit, the input end of the voltage feedback circuit and the input end of the voltage detection circuit. With reference to FIG. 5, in this embodiment, the first drive circuit 4 comprises two drive circuits 4-2 for outputting the control signals GT1, GT2, GT3 and GT4 of the first switching transistor M1, the second switching transistor M2, the third switching transistor M3 and the fourth switching transistor M4. Specifically, the first switching transistor M1, the second switching transistor M2, the third switching transistor M3 and the fourth switching transistor M4 are implemented by using a power transistor, such as a MOS transistor with a gate serving as a control end of a switching transistor, a source serving as a negative output end of the switching transistor, and a drain serving as a positive output end of the switching transistor.

With reference to FIG. 1 and FIG. 7, the DC-DC conversion circuit 11 in this embodiment is an interleaved voltage reduction circuit: GT1 and GT2 are two sets of PWM signals that are alternately driven. When the GT1 outputs a high level, the first switching transistor M1 is turned on, the second switching transistor M2 is turned off, the first DC signal DC1 is filtered into the second DC signal DC2 through the inductor L1 and the capacitor CE4. Meanwhile, the voltage of the second DC signal DC2 is detected by the voltage feedback circuit 5, when the voltage of the second DC signal DC2 is higher than the reference voltage in the voltage feedback circuit 5, a feedback signal is output to the first drive circuit 4 through the voltage feedback circuit 5, and then a low level is output by the first drive circuit 4 through the GT1 to turn off the first switching transistor M1. At the moment, the GT3 outputs a high level to drive the third switching transistor M3 to be turned on (the third switching transistor M3 can be replaced by a rectifier diode), to provide a magnetic discharge loop for the inductor L1 to prevent the inductor L1 from being saturated, and meanwhile, the capacitor CE4 is charged and the power is supplied to the second DC signal DC2.

After the first switching transistor M1 is turned off, the GT2 outputs a high level, and the second switching transistor M2 is turned on. The first DC signal DC1 is filtered into the second DC signal DC2 through the inductor L2 and the capacitor CE4. Meanwhile, the voltage of the second DC signal DC2 is detected by the voltage feedback circuit 5, when the voltage of the second DC signal DC2 is higher than the reference voltage in the voltage feedback circuit 5, a feedback signal is output to the first drive circuit 4 through the voltage feedback circuit 5, and then the first drive circuit 4 outputs a low level through the GT2 to turn off the second switching transistor M2. At the moment, the GT4 outputs a high level to drive the fourth switching transistor M4 to be turned on (the fourth switching transistor M4 can be replaced by the rectifier diode), to provide a magnetic discharge loop for the inductor L2 to prevent the inductor L2 from being saturated, and meanwhile, the capacitor CE4 is charged and the power is supplied to the second DC signal DC2.

In this embodiment, the purpose of converting the first DC signal DC1 into the second DC signal DC2 is achieved by alternate turn-on of two sets of driving signals GT1 and GT2. Meanwhile, the voltage of the second DC signal DC2 is detected by the voltage feedback circuit 5 and a feedback signal is output to the first drive circuit 4, such that the stability of the second DC signal DC2 may be maintained by controlling the amount of time for which the two sets of driving signals GT1 and GT2 are turned on.

Figure 8:
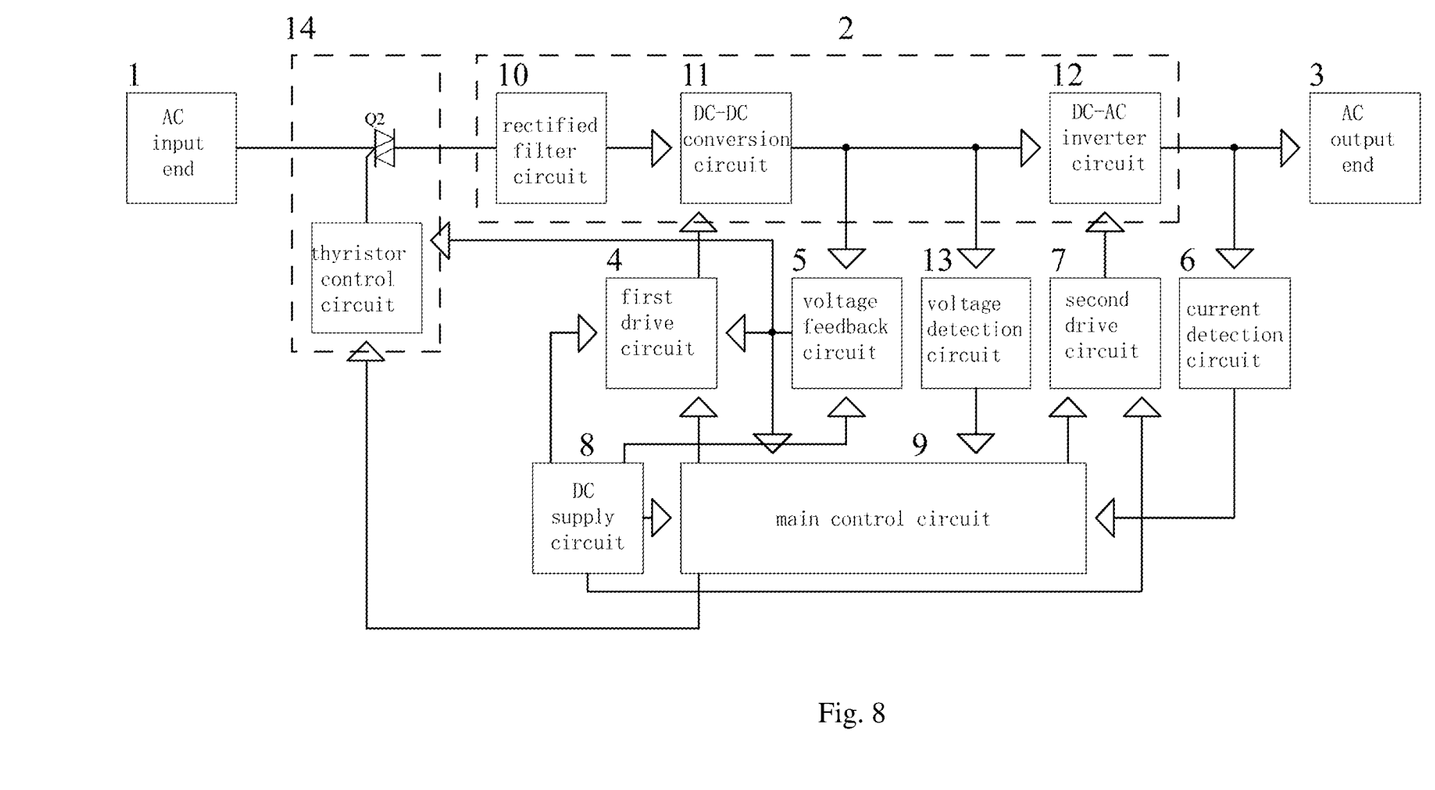
FIG. 8 is a circuit diagram of another specific embodiment of the AC-AC conversion circuit in the present disclosure.

As a further improvement of the technical solution, with reference to FIG. 8 which is a circuit diagram of another specific embodiment of the AC-AC conversion circuit in the present disclosure, the AC-AC conversion circuit further comprises a protection circuit 14, the protection circuit 14 comprises a thyristor Q2 and a thyristor control circuit. In this embodiment, the Q2 is a two-way thyristor with a first main electrode connected to the AC input end 1 and a second main electrode connected to the input end of the rectified filter circuit 10. The output end of the voltage feedback circuit 5 is connected to both of the input end of the main control circuit 9 and an input end of the thyristor control circuit. The output end of the main control circuit 9 is connected to an input end of the thyristor control circuit, and an output end of the thyristor control circuit is connected to a control end of the thyristor Q2.

With reference to FIG. 8, in this embodiment, a direct-current voltage at the output end of the DC-DC conversion circuit 11 is detected by the protection circuit 14 through the voltage feedback circuit 5. When the direct-current voltage at the output end of the DC-DC conversion circuit 11 is detected to be higher than the reference voltage in the voltage feedback circuit 5, a feedback signal is output to the thyristor control circuit by which the thyristor Q2 is turned off. Meanwhile, the main control circuit 9 outputs a latch signal to the thyristor control circuit through detecting the feedback signal output by the voltage feedback circuit 5, so as to more quickly prevent the AC-AC conversion circuit and an output load device from damage by high voltage.

The above is a detailed description to the preferred embodiments of the present disclosure, but the present disclosure is not limited to the embodiments, various equivalent deformations or substitutions can be made by those skilled in the art without departing from the scope of the present disclosure, and these equivalent deformations or substitutions are all included in the scope defined by the claims.

The invention claimed is:

1. An AC-AC conversion circuit, comprising:
   an AC input end;
   an AC output end;
   an AC-AC conversion unit, comprising:
      a rectified filter circuit with an input end connected to the AC input end;

a DC-DC conversion circuit with an input end connected to an output end of the rectified filter circuit; and a DC-AC inverter circuit with an input end connected to an output end of the DC-DC conversion circuit and an output end connected to the AC output end;

a voltage feedback circuit with an input end connected to the output end of the DC-DC conversion circuit;

a voltage detection circuit with an input end connected to the output end of the DC-DC conversion circuit;

a first drive circuit with an input end connected to an output end of the voltage feedback circuit and an output end connected to the input end of the DC-DC conversion circuit;

a current detection circuit with an input end connected to the output end of the DC-AC inverter circuit;

a second drive circuit with an output end connected to the input end of the DC-AC inverter circuit; and a main control circuit with an input end connected to both of an output end of the current detection circuit and an output end of the voltage detection circuit, and an output end connected to both of the input end of the first drive circuit and an input end of the second drive circuit.

2. The AC-AC conversion circuit according to claim 1, further comprising a DC supply circuit with an output end connected to each of the input end of the first drive circuit, the input end of the voltage feedback circuit, the input end of the main control circuit and the input end of the second drive circuit.

3. The AC-AC conversion circuit according to claim 1, further comprising a temperature detection circuit with an output end connected to the input end of the main control circuit.

4. The AC-AC conversion circuit according to claim 1, further comprising a fan control circuit with an input end connected to the output end of the main control circuit.

5. The AC-AC conversion circuit according to claim 1, wherein the voltage feedback circuit comprises:
a first sampling resistor with one end connected to the output end of the DC-DC conversion circuit;
a second sampling resistor with one end connected to another end of the first sampling resistor and another end grounded;
a third sampling resistor with one end connected to another end of the second sampling resistor;
a fourth sampling resistor with one end connected to the other end of the first sampling resistor and another end connected to another end of the third sampling resistor; and
a voltage comparator with an input end connected to another end of the fourth sampling resistor and an output end connected to the input end of the first sampling resistor.

6. The AC-AC conversion circuit according to claim 1, wherein the main control circuit comprises a singlechip.

7. The AC-AC conversion circuit according to claim 1, wherein the current detection circuit comprises:
an overcurrent detection circuit with an input end connected to the output end of the DC-AC inverter circuit and an output end connected to the input end of the main control circuit; and
an overload detection circuit with an input end connected to the output end of the DC-AC inverter circuit and an output end connected to the input end of the main control circuit.

8. The AC-AC conversion circuit according to claim 7, wherein the overcurrent detection circuit comprises:
a fifth sampling resistor with one end connected to the output end of the DC-AC inverter circuit and another end grounded;
a current sampling resistor with one end connected to the output end of the DC-AC inverter circuit and another end connected to the input end of the main control circuit; and
a first filter capacitor with one end connected to another end of the current sampling resistor and another end grounded.

9. The AC-AC conversion circuit according to claim 8, wherein the overload detection circuit comprises:
a sixth sampling resistor;
a seventh sampling resistor with one end connected to the one end of the fifth sampling resistor and another end connected to one end of the sixth sampling resistor, wherein another end of the sixth sampling resistor is grounded; and
a second filter capacitor with one end connected to both of another end of the seventh sampling resistor and the input end of the main control circuit and another end grounded.

10. The AC-AC conversion circuit according to claim 1, wherein the DC-DC conversion circuit comprises:
a LC filter with an output end connected to each of the input end of the DC-AC inverter circuit, the input end of the voltage feedback circuit and the input end of the voltage detection circuit;
a first switching transistor with a positive output end connected to the output end of the rectified filter circuit, a control end connected to the output end of the first drive circuit, and a negative output end connected to an input end of the LC filter; and/or
a second switching transistor with a positive output end connected to the output end of the rectified filter circuit, a control end connected to the output end of the first drive circuit, and a negative output end connected to the input end of the LC filter.

11. The AC-AC conversion circuit according to claim 1, wherein the voltage detection circuit comprises:
a first voltage sampling resistor;
a second voltage sampling resistor;
a third voltage sampling resistor;
a fourth voltage sampling resistor; and
a third filter capacitor;
wherein the output end of the DC-DC conversion circuit is connected to one end of the third voltage sampling resistor, another end of the third voltage sampling resistor is connected to both of one end of the second voltage sampling resistor and one end of the fourth voltage sampling resistor, another end of the second voltage sampling resistor is connected to one end of the first voltage sampling resistor and one end of the third filter capacitor; another end of the first voltage sampling resistor, anther end of the fourth voltage sampling resistor and another end of the third filter capacitor are grounded, and one end of the third filter capacitor is connected to the input end of the main control circuit.

12. The AC-AC conversion circuit according to claim 1, further comprising:
a protection circuit comprising:
a thyristor with a first connecting end connected to the AC input end and a second connecting end connected to the input end of the rectified filter circuit; and a thyristor control circuit with an input end connected to the output end of the main control circuit and an output end connected to a control end of the thyristor;

wherein the output end of the voltage feedback circuit is connected to both of the input end of the main control circuit and the input end of the thyristor control circuit.

13. An AC-AC conversion device, comprising an AC-AC conversion circuit comprising:

an AC input end;

an AC output end;

an AC-AC conversion unit, comprising:
  a rectified filter circuit with an input end connected to the AC input end;
  a DC-DC conversion circuit with an input end connected to an output end of the rectified filter circuit; and
  a DC-AC inverter circuit with an input end connected to an output end of the DC-DC conversion circuit and an output end connected to the AC output end;
  a voltage feedback circuit with an input end connected to the output end of the DC-DC conversion circuit;
  a voltage detection circuit with an input end connected to the output end of the DC-DC conversion circuit;
  a first drive circuit with an input end connected to an output end of the voltage feedback circuit and an output end connected to the input end of the DC-DC conversion circuit;
  a current detection circuit with an input end connected to the output end of the DC-AC inverter circuit;
  a second drive circuit with an output end connected to the input end of the DC-AC inverter circuit; and
  a main control circuit with an input end connected to both of an output end of the current detection circuit and an output end of the voltage detection circuit, and an output end connected to both of the input end of the first drive circuit and an input end of the second drive circuit.

* * * * *